United States Patent [19]

Schmid et al.

[11] 3,985,825

[45] Oct. 12, 1976

[54] ADDUCTS, CONTAINING EPOXIDE GROUPS, BASED ON POLYESTERDICARBOXYLIC ACIDS

[75] Inventors: Rolf Schmid, Gelterkinden; Friedrich Lohse, Oberwil; Willy Fatzer, Bottmingen; Hans Batzer, Arlesheim, all of Switzerland

[73] Assignee: Ciba-Geigy Corporation, Ardsley, N.Y.

[22] Filed: Dec. 6, 1974

[21] Appl. No.: 530,333

[30] Foreign Application Priority Data

Dec. 19, 1973 Switzerland ........ 17808/73

[52] U.S. Cl. ........ 260/835

[51] Int. Cl.² ........ C08L 63/00; C08L 63/10

[58] Field of Search ........ 260/835, 75 EP

[56] References Cited

UNITED STATES PATENTS

| | | | |
|---|---|---|---|
| 3,397,254 | 8/1968 | Wynstra | 260/835 |
| 3,408,421 | 10/1968 | Kurka | 260/835 |
| 3,523,143 | 8/1970 | Kwong | 260/835 |
| 3,529,034 | 9/1970 | Groff | 260/835 |
| 3,548,026 | 12/1970 | Weisfeld | 260/835 |
| 3,558,742 | 1/1971 | Schmid et al. | 260/835 |
| 3,576,903 | 4/1971 | Groff | 260/835 |
| 3,629,226 | 12/1971 | Lohse | 260/835 |
| 3,641,194 | 2/1972 | Schmid | 260/835 |
| 3,739,041 | 1/1973 | Schmid | 260/835 |
| 3,816,365 | 6/1974 | Schmid | 260/835 |

*Primary Examiner*—Murray Tillman
*Assistant Examiner*—T. Pertilla
*Attorney, Agent, or Firm*—Vincent J. Cavalieri

[57] ABSTRACT

Adducts containing epoxide groups, which have been (so-called) "advanced" with polyesters containing rings are obtained by reacting adducts containing epoxide groups, which have been obtained by reaction of certain long-chain aliphatic polyesters with diepoxide compounds in excess, with polyesterdicarboxylic acids, containing carbocyclic or heterocyclic rings, while heating, 0.3 – 0.5 carboxyl group equivalent of the polyester-dicarboxylic acid containing rings being employed per 1 epoxide equivalent of the adduct containing epoxide groups. Curing of the (so-called) "advanced" adducts containing epoxide groups gives flexible moulded materials which are distinguished, in particular, by high tear propagation resistance.

8 Claims, No Drawings

ADDUCTS, CONTAINING EPOXIDE GROUPS, BASED ON POLYESTERDICARBOXYLIC ACIDS

The present invention relates to new (so-called) "advanced" adducts containing epoxide groups, a process for their manufacture and their use in curable epoxide resin mixtures for the manufacture of moulded materials.

It is known that the flexibility of moulded materials manufactured from epoxide resins can be increased by adding plasticisers, such as polyalkylene glycols or long-chain polyesters. However, this type of plasticisation has the disadvantage that the moulded materials are relatively brittle at low temperatures, whilst they rapidly lose their mechanical strength at elevated temperatures.

It has already been proposed, in British patent specifications No. 1,182,728 and No. 1,183,434, to use long-chain aliphatic polyesters for the (so-called) "advancing" of epoxide resins, or as plasticisers in curable epoxide resin mixtures. Whilst curing epoxide resins which have been (so-called) "advanced" in this way, or epoxide resin mixtures which have been plasticised in this way, gives flexible and impact-resistant moulded materials, of which the mechanical properties are substantially independent of temperature, these moulded materials have average tensile strengths and elongations at break and also only mediocre toughness (half the product of the tensile strength and the elongation at break).

It is further known, from British patent specification No. 1,264,647, that moulded materials with particularly high tensile strengths are obtained by curing epoxide resins, which contain at least one carbocyclic or heterocyclic ring, with polycarboxylic acid anhydrides containing at least one carbocyclic ring, in the presence of acid polyesters containing carbocyclic or heterocyclic rings. However, these moulded materials have only a low elongation at break and hence also only have a low toughness.

It has now been found that (so-called) "advancing" of epoxide resins with two polyesters of different structures from one another gives readily processable adducts containing epoxide groups, which can be cured to give flexible moulded materials which have a higher elongation at break and hence greatly improved toughness and which are, in particular, distinguished by a high tear propagation resistance.

Accordingly, the present invention relates to epoxide resin mixtures containing (so-called) "advanced" adducts containing epoxide groups, from (1) an adduct containing epoxide groups, which has been obtained by reaction of (a) a polyepoxide compound with (b) 0.3 – 0.5 carboxyl group equivalent, per 1 epoxide equivalent of the polyepoxide compound (a), of a long-chain polyester-dicarboxylic acid of the formula I $$HO-\underset{\underset{O}{\|}}{C}-A-\underset{\underset{O}{\|}}{C}-OH \qquad (I)$$

in which formula I the radical A denotes a long-chain polyester radical in which unsubstituted or substituted alkylene and/or alkenylene chains alternate with carboxylic acid ester groups and the quotient Z/Q, wherein Z is the number of carbon atoms present in the recurring structural element of the radical A and Q is the number of oxygen bridges present in the recurring structural element of the radical A, must be at least 4 and preferably at least 5 and wherein, furthermore, the total number of carbon atoms present in the radical A is at least 50, and (2) 0.3 – 0.5 carboxyl group equivalent per 1 epoxide equivalent of the adduct (1) containing epoxide groups, of a polyester-dicarboxylic acid of the formula II $$HO-\underset{\underset{O}{\|}}{C}-R_2-\underset{\underset{O}{\|}}{C}\left(-O-R_1-O-\underset{\underset{O}{\|}}{C}-R_2-\underset{\underset{O}{\|}}{C}-\right)_nOH \qquad (II)$$

wherein $R_1$ and $R_2$ denote divalent aliphatic, araliphatic, cycloaliphatic, cycloaliphatic-aliphatic, aromatic or heterocyclic-aliphatic radicals and at least one of the two radicals $R_1$ and $R_2$ must contain a carbocyclic or heterocyclic ring or a ring system of this type and the recurring structural element of the formula $$\left(-O-R_1-O-\underset{\underset{O}{\|}}{C}-R_2-\underset{\underset{O}{\|}}{C}-\right)$$

does not contain more than 3 methylene groups per ring and $n$ denotes a number from 1 to 30, preferably from 4 to 20.

Preferably, the epoxide resin mixtures of the present invention contain (so-called) "advanced" adducts, containing epoxide groups, from (1) an adduct, containing epoxide groups, which is obtained by reaction of a polyepoxide compound with 0.4 – 0.5 carboxyl group equivalent, per 1 epoxide equivalent of the polyepoxide compound, of the long-chain polyester-dicarboxylic acid of the formula I, and (2) 0.4 – 0.5 carboxyl group equivalent, per 1 epoxide equivalent of the adduct (1) containing epoxide groups, of the polyester-dicarboxylic acid of the formula II.

The (so-called) "advanced" adducts containing epoxide groups are manufactured by reacting the adducts (1), containing epoxide groups, with the polyester-dicarboxylic acids of the formula II in the stated equivalent ratio, with heating, so as to form an adduct. As a rule, this reaction is carried out in the temperature range of 100° – 200° C, preferably of 120° – 180° C.

The adducts (1) containing epoxide groups are known compounds and can be manufactured in accordance with the process described in British Pat. No. 1,182,728 by reacting diepoxide compounds with long-chain dicarboxylic acids of the formula I, with heating, to form an adduct, 0.5 to 0.3 equivalent of carboxyl groups being employed per 1 equivalent of epoxide groups.

All classes of polyglycidyl compounds are suitable for the manufacture of the adducts containing epoxide groups, examples being polyglycidyl ethers of polyphenols or polyalcohols, polyglycidyl esters of polycarboxylic acids, polyglycidyl compounds of N-heterocyclic compounds, such as hydantoin, dihydrouracil, benzimidazolone or cyanuric acid, and the cycloaliphatic diepoxides. Preferably, aromatic, cycloaliphatic or N-heterocyclic diglycidyl compounds, and the cycloaliphatic diepoxide compounds, are used.

The long-chain dicarboxylic acids used to manufacture the adducts containing epoxide groups are acid polyesters with two terminal carboxyl groups.

The acid polyesters used preferentially correspond to the formula III $$HO-\underset{\underset{O}{\|}}{C}-R_3-\underset{\underset{O}{\|}}{C}\left(-O-R_4-O-\underset{\underset{O}{\|}}{C}-R_3-\underset{\underset{O}{\|}}{C}-\right)_m OH \qquad (III)$$

wherein $R_3$ and $R_4$ denote unsubstituted or substituted alkylene or alkenylene chains and each of the two radicals $R_3$ and $R_4$ must contain at least such a number of carbon atoms that the sum of the carbon atoms in $R_3$ and $R_4$ together is at least 8, and wherein the number m is so chosen that the product of m and of the sum of the number of C atoms in $R_3$ + C atoms in $R_4$ is at least 50.

However, it is also possible to use acid polyesters which have been manufactured by condensation of a suitable dicarboxylic acid with a mixture of two or more suitable diols, or conversely by condensation of a suitable diol with a mixture of two or more suitable dicarboxylic acids, in the correct mutual stoichiometric ratio. Of course, it is also possible to manufacture acid polyesters by condensation of mixtures of different dicarboxylic acids with mixtures of different diols, always providing that the conditions postulated above for the quotient Z/Q and for the total number of carbon atoms in the polyester chain remain observed.

Long-chain acid polyesters which are obtained by addition reaction of $(a + b)$ mols of a lactone with 1 mol of an aliphatic dicarboxylic acid and correspond to the formula IV $$HO-\left(\underset{\underset{O}{\|}}{C}-R_5-O-\right)_a\underset{\underset{O}{\|}}{C}-R_6-\underset{\underset{O}{\|}}{C}-\left(O-R_5-\underset{\underset{O}{\|}}{C}-\right)_b OH \qquad (IV)$$

wherein $R_5$ denotes an alkylene chain with at least 4 carbon atoms, $R_6$ represents an aliphatic hydrocarbon radical and the numbers *a* and *b* are so chosen that the product of $(a + b)$ and of the number of C atoms in $R_5$ is at least 50, are also suitable for the manufacture of the adducts containing epoxide groups.

In these long-chain polyesters, the recurring structural element in the polyester chain is thus formed by the lactone used, and the structural element contains only one oxygen bridge. In that case, the quotient Z/Q is equal to the number of carbon atoms in the hydrocarbon radical of the lactone from which the acid polyester is synthesised.

The adducts containing epoxide groups are as a rule manufactured by simply fusing the diepoxide compound with the corresponding acid polyester in the prescribed stoichiometric ratios. As a rule, this is carried out in the temperature range of 100° – 200° C, preferably 130° – 180° C.

The polyester-dicarboxylic acids of the formula II used for the (so-called) "advancing" of the adducts containing epoxide groups are known compounds and can be obtained in accordance with the process described in British Pat. No. 1,264,647 by polycondensation of diols of the formula $HO-R_1-OH$ with dicarboxylic acids of the formula $HOOC-R_2-COOH$ in the appropriate molar ratio. Further conditions to be observed are that the polyester components are so chosen that either the diol component or the acid component or both components contain one or more rings and that the aliphatic chains contained in the structural element of the formula II are not too long. For example, a dicarboxylic acid with more than 3 methylene groups in the molecule is only suitable for the purposes of the invention if the diol used for the esterification contains an appropriate number of rings. Thus, a polyester manufactured from adipic acid and bis-(4-hydroxycyclohexyl)-methane or 1,1-bis-(hydroxymethyl)-cyclohexene-3 would conform to the abovementioned condition.

Of course, it is also possible to use polyesters which are manufactured by condensation of a suitable dicarboxylic acid with a mixture of two or more suitable diols, or conversely by condensation of a suitable diol with a mixture of two or more suitable dicarboxylic acids in the correct mutual stoichiometric ratio. Naturally, it is also possible to use polyesters which have been manufactured by condensation of mixtures of different dicarboxylic acids with mixtures of different diols, provided that the conditions postulated above with regard to the structural elements remain observed.

Further, the molar ratio of the diol to the dicarboxylic acid must be so chosen for the polycondensation that the structural element of the formula II occurs at least three times in the polyester.

The following may be mentioned as dicarboxylic acids, containing at least one ring, which can be used to synthesise the polyesters containing the structural element of the formula II: phthalic acid, isophthalic acid, terephthalic acid, tetrachlorophthalic acid, tetrahydrophthalic acid, hexahydrophthalic acid, 4-methylhexahydrophthalic acid, 3,6-endomethylenetetrahydrophthalic acid, methyl-3,6-endomethylenetetrahydrophthalic acid, 3,4,5,6,7,7-hexachloro-3,6-endomethylenetetrahydrophthalic acid, diphenic acid, phenylenediacetic acid, hydroquinone-0,0'-diacetic acid, diomethane-0,0'-diacetic acid, and naphthalenedicarboxylic acids.

Where a diol containing at least one ring is chosen as a reactant for the esterification, non-cyclic dicarboxylic acids can also be used, examples being oxalic acid, malonic acid, succinic acid, glutaric acid, adipic acid, allylsuccinic acid, dodecylsuccinic acid and dodecenylsuccinic acid.

The following may be mentioned as dialcohols, containing at least one ring, which can be used for the synthesis of the polyesters containing the structural element of the formula II: 1,1-, 1,2-, 1,3- and 1,4-bis-(hydroxymethyl)-cyclohexane and the corresponding unsaturated cyclohexene derivatives such as, for example, 1,1-bis-(hydroxymethyl)-cyclohexene-3 and 1,1-bis-(hydroxymethyl)-2,5-endomethylenecyclohexene-3; hydrogenated diphenols, such as cis-quinitol, trans-quinitol, resorcitol, 1,2-dihydroxycyclohexane, bis-(4-hydroxycyclohexyl)-methane and 2,2-bis-(4'-hydroxycyclohexyl)-propane; tricyclo(5.2.1.$0^{2,6}$)-decane-3,9- or -4,8-diol, adducts of glycols to diallylidenepentaerythritol, for example, 3,9-bis(hydroxyethoxyethyl)-spirobi(metadioxane) and the diols containing a N-heterocyclic ring, such as 1,3-bis-(2-hydroxyethyl)-5,5-dimethylhydantoin, 1,3-bis-(2-hydroxy-n-propyl)-5-isopropylhydantoin, 1,3-bis-(2-phenyl-2-hydroxyethyl)-5,5-diethylhydantoin, 1,1'-methylenebis-(3-β-hydroxyethyl-5,5-dimethylhydantoin), 1,1'-methylene-bis-(3-β-hydroxy-n-propyl-5,5-dimethyl-hydantoin), 1,3-bis-(2-hyroxyethyl)-benzimidazolone, 1,3-bis-(2-hydroxy-n-propyl)-benzimidazolone, 1,3-bis-(2-phenyl-2-hydroxyethyl)-benzimidazolone and the partially or completely benz-hydrogenated derivatives.

Diphenols, such as hydroquinone, resorcinol, pyrocatechol or diomethane (= 2,2-bis(p-hydroxyphenyl)-propane) can also be used as diols for the synthesis of the polyesters.

Where a dicarboxylic acid containing at least one ring is chosen as a reactant for the esterification, non-cyclic diols can also be used, examples being ethylene glycol, 1,2-propanediol, 1,3-propanediol, 1,4-butanediol, 1,5-pentanediol and neopentyl glycol.

As a rule, the (so-called) "advanced" adducts containing epoxide groups are manufactured by simply fusing the adducts containing epoxide groups with the polyester-dicarboxylic acids of the formula (II) in the prescribed stoichiometric ratios. As a rule, this is carried out in the temperature range of 100° – 200° C, preferably 130° – 180° C.

The (so-called) "advanced" adducts containing epoxide groups, of the invention, react with the customary curing agents for polyepoxide compounds. They can therefore be crosslinked by addition of such curing agents, analogously to other polyfunctional epoxide compounds. Examples of such known curing agents which can be used are aliphatic, cycloaliphatic and aromatic polyamines, aliphatic, hydroaromatic and aromatic polycarboxylic acid anhydrides and also curing catalysts, such as tertiary amines or boron trifluoride complexes. Preferably, curing agents are used which on reaction with the polyepoxide used as the starting material for the manufacture of the adducts (that is to say the unplasticised polyepoxide) alone give cured moulded materials having a heat distortion point according to Martens, DIN 53,458, of at least 90° C and preferably at least 140° C.

Examples of such preferentially used curing agents are cycloaliphatic polycarboxylic acid anhydrides, such as tetrahydrophthalic anhydride, hexahydrophthalic anhydride, methylhexahydrophthalic anhydride, endomethylenetetrahydrophthalic anhydride, methylendomethylenetetrahydrophthalic anhydride (= methylnadic anhydride) and the Diels-Alder adduct of 2 mols of maleic anhydride and 1 mol of 1,4-bis-(cyclopentadienyl)-2-butene, or certain aromatic polycarboxylic acid anhydrides, such as trimellitic anhydride or pyromellitic dianhydride.

In curing with anhydrides, accelerators, such as tertiary amines, for example 2,4,6-tris-(dimethylaminomethyl)-phenol or alkali metal alcoholates, for example sodium methylate or sodium hexylate, can optionally be co-used. When curing the (so-called) "advanced" adducts containing epoxide groups, of the invention, with carboxylic acid anhydrides, 0.5 to 1.2 gram equivalents of anhydride groups are preferably used per 1 gram equivalent of epoxide groups.

The (so-called) "advanced" adducts containing epoxide groups, of the invention, can also be used as modifiers for conventional curable epoxide resins. In order that the advantageous properties of the moulded materials manufactured from the (so-called) "advanced" adducts containing epoxide groups, of the invention, should largely be preserved, the added amount of conventional epoxide resins should be so chosen that it does not exceed a proportion of 40 per cent by weight, relative to the total amount of epoxide resin.

The term "curing" as used here denotes the conversion of the (so-called) "advanced" adducts into insoluble and infusible crosslinked products, as a rule with simultaneous shaping to give mouldings, such as castings, pressings or laminates, or to give two-dimensional structures, such as lacquer films or adhesive bonds. Hence, a further subject of the present invention is the use of the (so-called) "advanced" adducts of the invention, together with curing agents for epoxide resins, such as polyamines or polycarboxylic acid anhydrides, and optionally conventional epoxide resins, in curable mixtures which can be used for the manufacture of moulded materials, such as mouldings, coatings or adhesive bonds.

The adducts according to the invention, or their mixtures with other polyepoxide compounds and/or curing agents, can furthermore be mixed, at any stage before curing, with fillers and reinforcing agents, pigments, dyestuffs, flameproofing substances or mould release agents.

Examples of fillers and reinforcing agents which can be used are glass fibres, boron fibres, carbon fibres, mica, quartz powder, hydrated aluminium trioxide, gypsum, burnt kaolin or metal powders, such as aluminium powders.

The curable mixtures, in the unfilled or filled state, can especially serve as laminating resins, dipping resins, impregnating resins, casting resins or potting and insulating compositions for the electrical industry. They can furthermore be used successfully for all other technical fields where customary epoxy resins are employed, for example as binders, adhesives, paints, lacquers, compression-moulding compositions and sintering powders.

I. MANUFACTURE OF THE STARTING MATERIALS

A. Manufacture of the long-chain, aliphatic polyesters

Polyester I 1,110 g (5.5 mols) of sebacic acid were mixed with 520 g (5.0 mols) of neopentyl glycol (corresponding to a molar ratio of 11 : 10) and the mixture was warmed to 185° C under a nitrogen atmosphere. It was then allowed to react further for 5 hours at 185° C and 2 hours under 24 – 16 mm Hg. The resulting polyester was a yellow viscous mass with an acid equivalent weight of 1,080 (theory: 1,450).

Polyester II 1,168 g (8 mols) of adipic acid were mixed with 728 g (7 mols) of neopentyl glycol and the mixture was warmed to 170° C under a nitrogen atmosphere. It was then warmed to 210° C over the course of 4 hours and thereafter allowed to continue to react for 2 hours at 180° C under 14 mm Hg.

The resulting polyester is a yellow viscous mass with an acid equivalent weight of 705 (theory: 822).

Polyester III 803 g (5.5 mols) of adipic acid and 590 g (5.0 mols) of 1,6-hexanediol (corresponding to a molar ratio of 11:10) were mixed in a sulphonation flask equipped with a descending condenser and heated to 180°–190° C over the course of 12 hours, under nitrogen. At that stage the product had an acid equivalent weight of 1,102 (theory: 1,213) and slowly crystallised out on storage at room temperature.

Polyester IV 380.5g(2.025 mols) of azelaic acid were mixed with 169.0 g (1.825 mols + a 3% excess) of 1,3-butanediol (corresponding to a molar ratio of 10:9) and the reaction mixture was warmed to 160° C under nitrogen. It was then allowed to react for 5 hours at 160° C and 20 hours at the same temperature under 40–20 mm Hg. In the course thereof, 60.3 g of water (theory: 65.5 g) were split off. The reaction product was a viscous brown clear mass with an acid equivalent weight of 1,160 (theory: 1,183).

B. Manufacture of the adducts containing epoxide groups

Adduct I 1,080 g (1.0 acid equivalent) of Polyester I and 390 g (2.5 epoxide equivalents) of 3',4'-epoxyhexahydrobenzal-3,4-epoxycyclohexane-1,1-dimethanol were allowed to react for 3 hours at 140° C. The resulting adduct was a highly viscous, dark brown mass with an epoxide equivalent weight of 968.

Adduct II 2,000 g of Polyester II and 1,000 g of bisphenol A diglycidyl ether with 5.4 epoxide equivalents/kg (corresponding to a ratio of 1 carboxyl equivalent per 2 epoxide equivalents) were allowed to react for 3 hours at 140° C. The resulting adduct was a light brown, viscous mass with an epoxide equivalent weight of 1,290.

Adduct III 600 g of Polyester II and 300 g of tetrahydrophthalic acid diglycidyl ester with an epoxide content of 6.4 epoxide equivalents/kg (corresponding to a ratio of 1 carboxyl equivalent per 2 epoxide equivalents) were allowed to react for 3 hours at 140° C. The resulting adduct was a light brown mass of low viscosity, with an epoxide equivalent weight of 1,062.

Adduct IV 551.0 g (0.5 acid equivalent) of Polyester III were mixed with 192.5 g (1.25 epoxide equivalents) of an industrially manufactured tetrahydrophthalic acid diglycidyl ester and the mixture was allowed to react for 20 minutes at 110° C and 80 minutes at 130° C. The epoxide equivalent weight of the resulting adduct was then 921 (theory: 895). The product was light yellow and highly viscous, and some crystallisation occurred at room temperature.

Adduct V 526 g (0.456 acid equivalent) of Polyester IV were mixed with 147.4 g (1.14 epoxide equivalents) of 1,3-diglycidylbenzimidazolone (corresponding to 2.5 epoxide equivalents per 1 acid equivalent) and the mixture was allowed to react for 1 hour at 125°–130° C. At that stage, the resulting adduct had an epoxide equivalent weight of 985 (theory: 968) and was a clear, brown, highly viscous mass.

Adduct VI 1,000 g (0.906 acid equivalent) of Polyester III were mixed with 1,000 g (5.4 epoxide equivalents) of an industrially manufactured bisphenol A diglycidyl ether and the mixture was heated to 140° C whilst stirring. After 3 hours, the reaction was discontinued. The epoxide equivalent weight of the crystalline mass at that stage is 392.

C. Manufacture of the polyesters containing rings

Polyester A 433.6 g (2.75 mols) of hexahydrophthalic anhydride were mixed with 362.0 g (2.5 mols + 2% excess) of 1,1-bis-(hydroxymethyl)-cyclohexene-3 (corresponding to a molar ratio of 11 : 10) and the mixture was warmed to 185° C under a nitrogen atmosphere. It was then allowed to react further for 15 hours at 185° C and 7 hours at the same temperature under 12 mm Hg. The resulting product was a yellowish, clear, glassy mass with an acid equivalent weight of 1,215 (theory: 1,476) and a glass transition temperature of 51° C.

Polyester B 924 g (6 mols) of hexahydrophthalic anhydride and 710 g (5 mols) of 1,1-bis(hydroxymethyl)-cyclohexene-3 were warmed to 160° C under a nitrogen atmosphere and allowed to react for 3 hours at 160° C, 2 hours at 180° C and 9 hours under 35 – 55 mm Hg at 180° C. The resulting polyester was a light brown, solid mass with an acid equivalent weight of 704 (theory: 781) and a glass transition temperature of 40° C.

Polyester C 808.5 g (5.25 mols) of hexahydrophthalic anhydride were mixed with 724 g (5.0 mols + 2% excess) of 1,1-bis-(hydroxymethyl)-cyclohexene-3 (corresponding to a molar ratio of 21 : 20) and the mixture was warmed to 180° C under a nitrogen atmosphere. It was then allowed to react further for 5 hours at 180° C and 58 hours under 60–65 mm Hg at the same temperature. The resulting polyester was a light brown, solid mass with a melting point of 80°–90° C and an acid equivalent weight of 2,518 (theory: 2,857). The glass transition temperature of the polyester was 85° C.

Polyester D 1,293.6 g (8.4 mols) of hexahydrophthalic anhydride and 1,615.0 g (7.0 mols + 2% excess) of 1,3-bis-(2-hydroxyethyl)-1,2,3,6-tetrahydrobenzimidazolone (corresponding to a molar ratio of 6:5) were mixed in a sulphonation flask equipped with a descending condenser and allowed to react for 48 hours at 190° C under nitrogen. At that stage, the acid equivalent weight was 929 (theory: 991). The product is a light brown, clear, glassy mass.

Polyester E 770 g (5 mols) of hexahydrophthalic anhydride and 1,584 g (4.5 mols) of 1,1'-methylene-bis-[3-(2'-hydroxyethyl)-5,5-dimethylhydantoin] were mixed in a sulphonation flask equipped with a descending condenser, 1.1 g of p-toluenesulphonic acid were added and the mixture was allowed to react for 40 hours under nitrogen at 200°–210° C. This gave a product with an acid equivalent weight of 2,182 (theory: 2,282). The polyester was light yellow in colour, and of glassy consistency.

Polyester F 814 g (5.5 mols) of phthalic anhydride and 720 g (5.0 mols) of 1,4-bis-(hydroxymethyl)-cyclohexane were fused in a sulphonation flask equipped with a descending condenser and then heated to 160°–170° C for 18 hours under nitrogen. In the course thereof, 79 g of water (theory: 81 g) distilled over, and the acid equivalent weight was 1,478 (theory: 1,453). The product was a pale yellowish-coloured mass.

II. MANUFACTURING EXAMPLES

Examples 1

284 g (0.22 epoxide equivalent) of Adduct II and 70.4 g (0.1 acid equivalent) of Polyester B were allowed to react for 3 hours at 140° C. The epoxide resin obtained after cooling was a light brown, highly viscous to rubbery mass with an epoxide equivalent weight of 2,130.

Example 2

242 g (0.25 epoxide equivalent) of Adduct I and 121.5 g (0.1 acid equivalent) of Polyester A were allowed to react for 3 hours at 140° C. The epoxide resin obtained after cooling was a brown, highly viscous mass with an epoxide equivalent weight of 3,850.

EXAMPLE 3

242 g (0.25 epoxide equivalent) of Adduct I and 251.8 g (0.1 acid equivalent) of Polyester C were allowed to react for 3 hours at 140° C. The epoxide resin obtained after cooling was a brown, highly viscous mass with an epoxide equivalent weight of 3,330.

EXAMPLE 4

234 g (0.22 epoxide equivalent) of Adduct III and 251.8 g (0.1 carboxyl equivalent) of Polyester C were allowed to react for 2 hours at 170°– 180° C. The epoxide resin obtained after cooling was a brown, viscous mass with an epoxide equivalent weight of 2,780.

EXAMPLE 5

230 g (0.25 epoxide equivalent) of Adduct IV and 147.8 g (0.1 carboxyl equivalent) of Polyester F (corresponding to a molar ratio of 2.5:1) were allowed to react for 3 hours at 140°–150° C. The resulting adduct was light yellow and slightly crystalline and had an epoxide equivalent weight of 3,480.

EXAMPLE 6

117.7 g (0.3 epoxide equivalent) of Adduct VI and 92.9 g (0.1 carboxyl equivalent) of Polyester D (corresponding to a molar ratio of 3:1) were allowed to react for 3 hours at 140°–150° C. The resulting adduct was a yellow, slightly turbid mass with an epoxide equivalent weight of 1,320.

EXAMPLE 7

185.8 g (0.2 carboxyl equivalent) of the Polyester D containing ring structures and 492.5 g (0.5 epoxide equivalent) of the Adduct V described earlier were mixed and the mixture was slowly heated to 130° C. It was then allowed to react for one hour at 130° C, the resulting adduct having an epoxide equivalent weight of 1,923 (theory: 2,261).

EXAMPLE 8

378 g (0.3 epoxide equivalent) of the Adduct II were warmed with 218 g (0.1 carboxyl equivalent) of Polyester E to 140° C, well mixed and allowed to react for 2 hours. A viscous to rubbery product was obtained (epoxide equivalent weight 2,982 according to theory).

III. APPLICATION EXAMPLES

Example I 213 g (0.1 epoxide equivalent) of the epoxide resin manufactured according to Example 1, 37 g (0.2 epoxide equivalent) of bisphenol A diglycidyl ether with 5.4 epoxide equivalents/kg, 46.2 g (0.3 equivalent of anhydride groups) of hexahydrophthalic anhydride and 0.1 percent by weight of benzyldimethylamine were warmed to 140° C, and well mixed. The mixture was briefly subjected to a vacuum to remove the air bubbles and then poured into pre-warmed aluminium moulds of dimensions 150×150×4 mm and 150×150×1 mm, which had been treated with a release agent, and cured for 16 hours at 140° C. Mouldings having the following properties were obtained:

| | |
|---|---|
| Tensile strength (according to VSM 77,101*) | = 29.1 N/mm² |
| Elongation at break (according to VSM 77,101) | = 223% |
| Toughness | = 32.4 N/mm² |
| Tear propagation resistance (according to DIN 53,363**) | = 15 kg. |

-continued

*VS = Normvorschrift des Vereins Schweizerischer Maschinenindustrien
**DIN = Deutsche Industrie-Norm $N$ = Newton; $1\ N = 1\ kg \times 1\ m/sec^2$; $1\ \frac{N}{mm^2} = 10\ kp/cm^2$ $$\text{Toughness} = \frac{\text{Tensile strength} \times \text{Elongation at break}}{2}$$

EXAMPLE II 385 g (0.1 epoxide equivalent) of the epoxide resin manufactured according to Example 2 15.4 g (0.1 equivalent of anhydride groups) of hexahydrophthalic anhydride and 0.1 percent by weight of benzyldimethylamine were mixed, and cured, analogously to Example 1. Mouldings with the following properties were obtained:

| | |
|---|---|
| Tensile strength (according to VSM 77,101) | = 17.5 N/mm² |
| Elongation at break (according to VSM 77,101) | = 370% |
| Toughness | = 32.4 N/mm² |

EXAMPLE III 115.5 g (0.03 epoxide equivalent) of the epoxide resin manufactured according to Example 2, 1.85 g (0.01 equivalent) of bisphenol A diglycidyl ether with an epoxide content of 5.4 equivalents/kg, and 6.16 g (0.04 equivalent of anhydride groups) of hexahydrophthalic anhydride were processed, and cured, analogously to Example I. Mouldings with the following properties were obtained:

| | |
|---|---|
| Tensile strength (according to VSM 77,101) | = 18.5 N/mm² |
| Elongation at break (according to VSM 77,101) | = 300% |
| Toughness | = 27.75 N/mm² |

EXAMPLE IV 333 g (0.1 epoxide equivalent) of the epoxide resin manufactured according to Example 3, 15.4 g (0.1 equivalent of anhydride groups) of hexahydrophthalic anhydride and 0.1 percent by weight of benzyldimethylamine were processed, and cured, analogously to Example I. The resulting mouldings had the following properties:

| | |
|---|---|
| Tensile strength (according to VSM 77,101) | = 18.5 N/mm² |
| Elongation at break (according to VSM 77,101) | = 330% |
| Toughness | = 30.5 N/mm² |

EXAMPLE V 174 g (0.05 epoxide equivalent) of the epoxide resin manufactured according to Example 5, 92.5 g (0.5 epoxide equivalent) of bisphenol A diglycidyl ether and 92.4 g (0.6 carboxyl equivalent) of hexahydrophthalic anhydride were processed, and cured, analogously to Example I. Soft but very tough mouldings were obtained. Tests on the mouldings give the following values:

| | |
|---|---|
| Tensile strength (according to VSM 77,101) | = 21 N/mm² |
| Elongation at break (according to VSM 77,101) | = 270% |

EXAMPLE VI 132 g (0.1 epoxide equivalent) of the epoxide resin manufactured according to Example 6, 12.8 g (0.1 epoxide equivalent) of N,N'-diglycidyl-5,5-dimethylhydantoin with an epoxide content of 7.8 epoxide equivalents/kg, 53.2 g (0.2 carboxyl equivalent) of dodecenylsuccinic anhydride and 1 g of benzyldimethylamine were processed, and cured, analogously to Example I. Mouldings with the following properties were obtained:

| | |
|---|---|
| Tensile strength (according to VSM 77,101) | = 34 N/mm² |
| Elongation at break (according to VSM 77,101) | = 60% |

EXAMPLE VII 38.5 g (0.02 epoxide equivalent) of the epoxide resin manufactured according to Example 7 were warmed to 140° C and well mixed with 7.7 g (0.06 epoxide equivalent) of N,N'-diglycidyl-5,5-dimethylhydantoin and 12.3 g (0.08 carboxyl equivalent) of hexahydrophthalic anhydride, and the mixture was processed, and cured, analogously to Example I. Mouldings with the following properties were obtained:

| | |
|---|---|
| Tensile strength (according to VSM 77,101) | = 23 N/mm² |
| Elongation at break (according to VSM 77,101) | = 110% |

EXAMPLE VIII 44.7 g (0.015 epoxide equivalent) of the epoxide resin manufactured according to Example 8 were warmed to 140° C and well mixed with 9.6 g (0.075 epoxide equivalent) of N,N'-diglycidyl-5,5-dimethylhydantoin and 13.9 g (0.09 carboxyl equivalent) of hexahydrophthalic anhydride, and the mixture was processed, and cured, analogously to Example I. Mouldings with the following properties were obtained:

| | |
|---|---|
| Tensile strength (according to VSM 77,101) | = 54 N/mm² |
| Elongation at break (according to VSM 77,101) | = 7% |
| Tear propagation resistance (according to DIN 53,363) | = 6.3 kg. |

What we claim is:

1. An epoxide resin composition consisting essentially of advanced adducts containing epoxide groups, and advanced adducts being formed from (1) an adduct containing epoxide groups, which has been obtained by reaction of (a) a polyepoxide compound with (b) 0.3–0.5 carboxyl group equivalent, per 1 epoxide equivalent of the polyepoxide compound (a), of a long-chain aliphatic polyesterdicarboxylic acid of the formula I $$\mathrm{HO{-}\underset{\displaystyle\overset{\|}{O}}{C}{-}A{-}\underset{\displaystyle\overset{\|}{O}}{C}{-}OH} \qquad \text{(I)}$$

wherein A denotes a long-chain polyester residue in which unsubstituted or substituted alkylene and/or alkenylene chains alternate with carboxylic acid ester groups and the quotient Z/Q, wherein Z is the number of carbon atoms present in the recurring structural element of the residue A and Q is the number of oxygen bridges present in the recurring structural element of the residue A, must be at least 4 and wherein, furthermore, the total number of carbon atoms present in the residue A is at least 50, and (2) 0.3–0.5 carboxyl group equivalent per 1 epoxide equivalent of the adduct (1) containing epoxide groups, of a polyester-dicarboxylic acid of the formula II $$\mathrm{HO{-}\underset{\displaystyle\overset{\|}{O}}{C}{-}R_2{-}\underset{\displaystyle\overset{\|}{O}}{C}\left(O{-}R_1{-}O{-}\underset{\displaystyle\overset{\|}{O}}{C}{-}R{-}\underset{\displaystyle\overset{\|}{O}}{C}\right)_{\!n}OH} \qquad \text{(II)}$$

which is different from the polyester of formula I wherein $R_1$ and $R_2$ each is a member selected from the group consisting of divalent aliphatic residue, divalent araliphatic residue, divalent cycloaliphatic residue, divalent cycloaliphatic-aliphatic residue, divalent aromatic residue and divalent heterocyclic-aliphatic residue and at least one of the two residues $R_1$ and $R_2$ must contain a carbocyclic or heterocyclic ring or a ring system of this type and the recurring structural element of the formula $$\mathrm{\left(O{-}R_1{-}O{-}\underset{\displaystyle\overset{\|}{O}}{C}{-}R_2{-}\underset{\displaystyle\overset{\|}{O}}{C}\right)}$$

does not contain more than 3 methylene groups per ring and *n* denotes a number from 1 to 30.

2. An epoxide resin composition according to Claim 1, comprising advanced adducts containing epoxide groups, said advanced adducts being formed from (1) an adduct, containing epoxide groups, which is obtained by reaction of a polyepxoide compound with 0.4–0.5 carboxyl group equivalent, per 1 epxoide equivalent of the polyepoxide compound, of the long-chain polyester-dicarboxylic acid of the formula I, and (2) 0.4–0.5 carboxyl group equivalent, per 1 epoxide equivalent, per 1 epoxide equivalent of the adduct (1) containing epoxide groups, of the polyester-dicarboxylic acid of the formula II.

3. An epoxide resin according to claim 1, characterised in that $R_1$ and $R_2$ in the polyester-dicarboxylic acid of the formula II each is a member selected from the group consisting of divalent araliphatic residue, divalent aromatic residue, divalent cycloaliphatic residue, divalent cycloaliphatic-aliphatic residue and divalent heterocyclic-aliphatic residue and not more than 2 methylene residues being present in the recurring structural element per ring in the radical $R_1$ and $R_2$.

4. An epoxide resin according to claim 1, characterised in that the polyester-dicarboxylic acid of the formula II is derived from hexahydrophthalic acid as the dicarboxylic acid component and from 1,1-bis-(hydroxymethyl)-cyclohexene-3 as the diol component.

5. An epoxide resin according to claim 1, characterised in that the polyester-dicarboxylic acid of the formula II is derived from hexahydrophthalic acid or phthalic acid as the dicarboxylic acid component and from 1,3-bis-(2'-hydroxyethyl)-1,2,3,6-tetrahydrobenzimidazolone, 1,1-methylene-bis-3-(2'-hydroxyethyl)-5,5-dimethylhydantoin or 1,4-bis-(hydroxymethyl)-cyclohexane as the diol component.

6. An epoxide resin according to claim 1, characterised in that the adduct (1), containing epoxide groups, is derived from a member selected from the group consisting of aromatic diepoxide, cycloaliphatic diepoxide and N-heterocyclic diepoxide as the polyepoxide compound.

7. An epoxide resin according to claim 1, characterised in that the adduct, containing epoxide groups, and the long-chain polyester-dicarboxylic acid of the formula I, said adduct is derived from a polyester-dicarboxylic acid of the formula $$HO-\underset{\underset{O}{\|}}{C}-R_3-\underset{\underset{O}{\|}}{C}-\left[O-R_4-O-\underset{\underset{O}{\|}}{C}-R_3-\underset{\underset{O}{\|}}{C}\right]_m-OH$$

wherein $R_3$ and $R_4$ denote unsubstituted or substituted alkylene or alkenylene chains and each of the two radicals $R_3$ and $R_4$ must contain at least such a number of carbon atoms that the sum of the carbon atoms in $R_3$ and $R_4$ together is at least 8, and wherein the number $m$ is so chosen that the product of $m$ and of the sum of the number of C atoms in $R_3$ and number of C atoms in $R_4$ is at least 50.

8. An epoxide resin according to claim 1, characterised in that the adduct, containing epoxide groups and the long-chain polyester-dicarboxylic acid of the formula I, said adduct is derived from a polyester-dicarboxylic acid of the formula $$HO-\left[\underset{\underset{O}{\|}}{C}-R_5-O\right]_a-\underset{\underset{O}{\|}}{C}-R_6-\underset{\underset{O}{\|}}{C}-\left[O-R_5-\underset{\underset{O}{\|}}{C}\right]_b-OH$$

wherein $R_5$ denotes an alkylene chain with at least 4 carbon atoms, $R_6$ represents an aliphatic hydrocarbon residue and the numbers $a$ and $b$ are so chosen that the product of $(a+b)$ and of the number of the C atoms in $R_5$ is at least 50.

* * * * *